United States Patent [19]

Okino

[11] Patent Number: 5,014,075
[45] Date of Patent: May 7, 1991

[54] MULTIBEAM RECORDER USING MIRROR REFLECTED PARALLEL SCAN LINES

[75] Inventor: Yoshiharu Okino, Kanagawa, Japan

[73] Assignee: Fuji Photo Film Co., Ltd., Kanagawa, Japan

[21] Appl. No.: 524,686

[22] Filed: May 14, 1990

Related U.S. Application Data

[63] Continuation of Ser. No. 246,115, Sep. 19, 1988, abandoned.

[30] Foreign Application Priority Data

Sep. 18, 1987 [JP] Japan .................................. 62-232682

[51] Int. Cl.$^5$ ............................................. G01D 15/16
[52] U.S. Cl. ..................................... 346/108; 346/160
[58] Field of Search ................. 346/108, 107 R, 76 L, 346/160; 358/75, 296

[56] References Cited

U.S. PATENT DOCUMENTS 4,467,334 8/1984 Anzai ................................... 346/108
4,821,113 4/1989 McQuade ............................ 346/108

Primary Examiner—Mark J. Reinhart
Attorney, Agent, or Firm—Sughrue, Mion, Zinn, Macpeak & Seas

[57] ABSTRACT

An image recording apparatus for recording an image by controlling the scanning and irradiation of a photosensitive material with a number of optical beams having different wavelengths. The image recording apparatus includes light emitting devices disposed close to one another in a common plane for irradiating the number of beams in parallel with a scanning line. The apparatus further includes a rotatable polygon mirror having reflecting faces for reflecting the irradiated optical beams from the light emitting devices for scanning and exposing the photosensitive material. The light emitting devices are arranged to irradiate the reflecting faces of the polygon mirror at a substantially common point.

11 Claims, 3 Drawing Sheets

MULTIBEAM RECORDER USING MIRROR REFLECTED PARALLEL SCAN LINES

This is a continuation of Application Ser. No. 07/246,115, filed Sept. 19, 1988, now abandoned.

FIELD OF THE INVENTION

The present invention relates to an image recording apparatus for recording an image by scanning and irradiating a photosensitive material with a plurality of optical beams in which each of the optical beams has a different wavelength

BACKGROUND OF THE INVENTION

An image recording apparatus using a plurality of optical beams, wherein each of the optical beams has a different wavelength is known. In such an apparatus, density signals which express the image of a document are converted into optical signals with a gas or semiconductor laser to record the image on a photosensitive material. Especially well known is an apparatus for forming a color image with trichromatic beams.

In this apparatus, a plurality of optical beams having desired densities are emitted, as shown in FIG. 1, and are composed into one optical axis by using a dichroic mirror $M_0$ and half mirrors $M_1$ and $M_2$ so that the optical beams may expose a photosensitive material at a substantially common point. In another known apparatus the photosensitive material is irradiated with optical beams which are perpendicular or parallel to the scanning line In this apparatus a predetermined position on the photosensitive material can be irradiated with the optical beams of the desired densities by controlling devices which shift the emission timings of the individual beams In the case of the former apparatus shown in FIG. 1 the point of incidence upon a polygon mirror PM for the scanning and exposing operations can b Ⓡfocused by integrating the optical axes so that the polygon mirror and its drive motor can have their sizes reduced. Despite this advantage, however, the number of parts in the optical system is increased, thereby making the optical system complex, and making the adjustment for composing the optical axes delicate so that the time period for the adjustment necessarily becomes long Another disadvantage is that the optical beams are attenuated by the mirrors, thereby decreasing the amount of exposure at the focal point. In the case of the latter apparatus, the irradiated positions on the polygon mirror are different from each other, thereby causing a problem in that the polygon mirror and its drive motor need to be of a relatively large size in order to cover the required scanning range on the photosensitive material.

SUMMARY OF THE INVENTION

Therefore, an object of the present invention is to solve the above-specified problems The present invention solves these problems by providing an image recording apparatus which has a relatively small optical system, and which has its optical axis adjustment simplified.

According to a major feature of the present invention, there is provided an image recording apparatus for recording an image by controlling the scanning and irradiation of a photosensitive material with a plurality of optical beams having different wavelengths, which apparatus comprises, light emitting means disposed close to one another in a common plane for accomplishing the irradiations of the plural beams in parallel with a scanning line; and a rotatable polygon mirror for reflecting the optical beams emitted from the light emitting means for scanning and exposing the photosensitive material, wherein the light emitting means are arranged to irradiate the reflecting faces of the polygon mirror at a substantially common point.

According to the construction of the present invention, each of the light emitting means irradiates the reflecting faces of the polygon mirror at a substantially common point. As a result, the optical axis adjustment is facilitated, and the optical attenuation is reduced Moreover, the distance between the light emitting means and the polygon mirror can be set to a longer distance than the distance between the polygon mirror and the color photosensitive material so that the offset among the three optical beams on the photosensitive material is reduced.

The photosensitive material to be used in the present invention may be any type which has at least two kinds of different spectroscopic sensitivities.

For example, there can be used a positive or negative color photosensitive material which has a dichromatic spectroscopic sensitivity to blue, green and red colors. Another may be the so-called infrared color film which has an effective sensitivity to green, red and infrared ranges. Moreover, the color photosensitive material to be used with the present invention may be a thermal development or a pressure-sensitive type The thermal development type color photosensitive material is disclosed in for example, Japanese Patent Laid-Open No. 57-179840. This material is a diffusion transfer type thermal development color photosensitive material which contains a dyestuff donor substance for releasing a diffusion dyestuff when in a thermal development. The carrier carries at least a photosensitive silver halide an oxidizer of organic silver salt, a hydrophobic binder, a dyestuff releasing assistance and a reducing dyestuff donor substance.

Another pressure-sensitive color photosensitive material, as disclosed in Japanese Patent Laid-Open No. 57-179836, is of the type in which a polymerizable compound is exposed and set in the form of an image and is then pressed to form a visible image. The support of this material carries a synthesized high-molecular resin wall capsule which contains a vinyl compound, a photopolymerization initiator and a dyestuff precursor.

Still another type is disclosed in Japanese Patent Laid-Open No. 60-121284 or 61-53881, in which a silver halide contained in the photosensitive material is exposed and thermally developed, and in which a polymerizable compound is set in accordance with the developed image and pressurized to form a visible image In the material disclosed in Japanese Patent Laid-Open No. 60-121284, after the thermal development, a color image forming substance is transferred to an image receiving material having an image receiving layer to form the image on the image receiving material At least a photosensitive silver halide a reducing agent, a polymerizable compound and a color image forming substance are applied to the carrier, and at least the polymerizable compound and the color image forming substance are confined in a common micro-capsule. On the other hand, the material disclosed in Japanese Patent Laid-Open No 61-53881 forms an image thereon without any use of the image receiving material The photosensitive material contains a silver halide, a reducing agent, a polymerizable compound and two kinds of substances for causing a color developing reaction in a contacting state. One of these substances for the color development and the polymerizable compound is confined in a micro-capsule. The carrier has a photosensitive layer in which the other substance is present outside of the micro-capsule confining the polymerizable compound.

The thermal development type color photosensitive material, and the pressure-sensitive color photosensitive material specified above, have their spectroscopic sensitivities generally in the green, red and infrared ranges. By selecting the sensitizing dyestuff to be used, however, it is possible to prepare the photosensitive material which has a spectroscopic sensitivity to blue, green and red ranges or another spectroscopic sensitivity, if necessary.

BRIEF DESCRIPTION OF THE DRAWINGS

Other objects, features and advantages of the present invention will become apparent from the following description taken with reference to the accompanying drawings, in which.

DESCRIPTION OF THE PREFERRED EMBODIMENTS

The present invention will now be described in connection with various embodiments.

Figure 2:
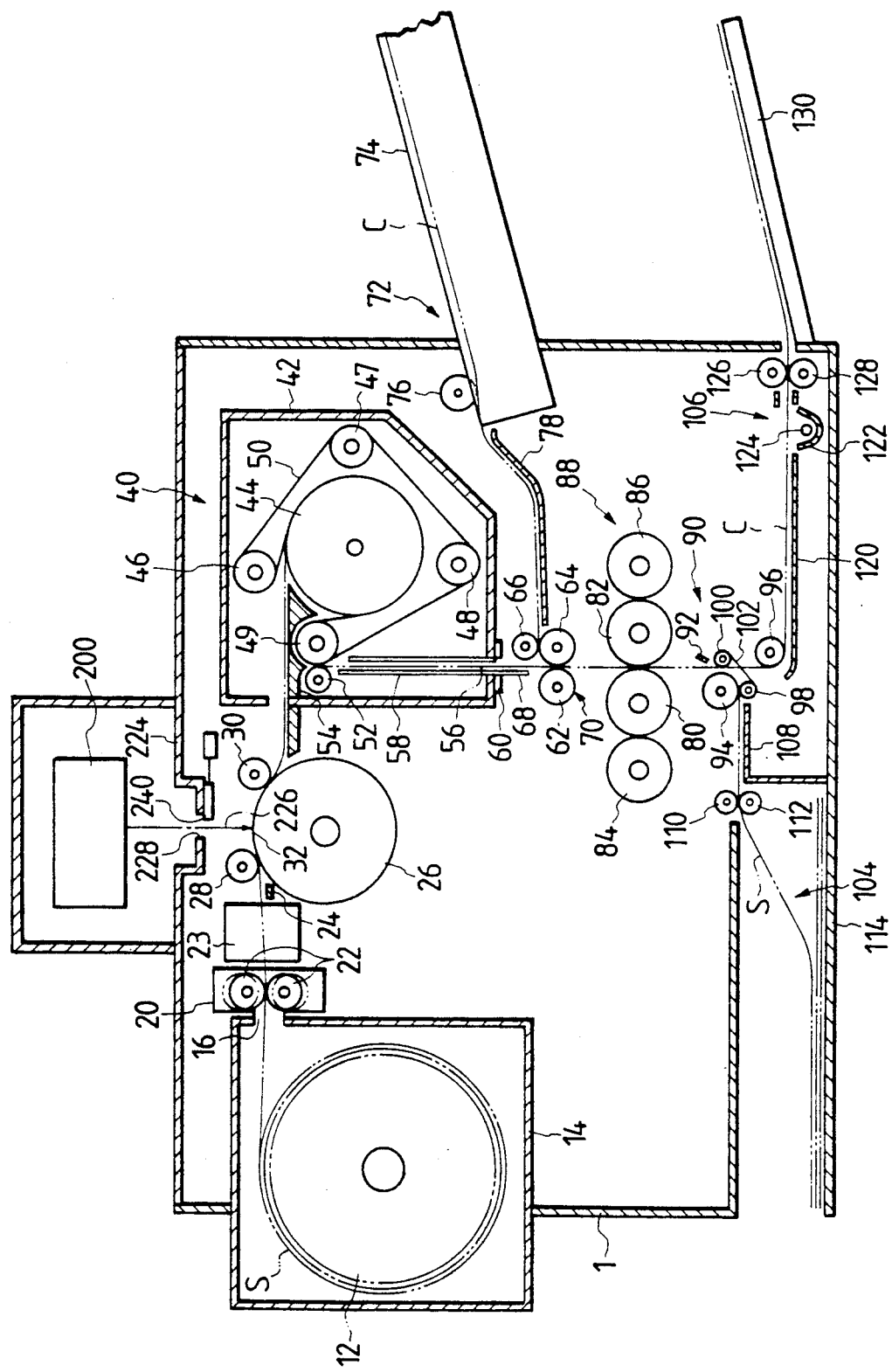
FIG. 2 is a schematic view showing an image recording apparatus according to one embodiment of the present invention.

FIG. 2 shows an image recording apparatus according to the present invention. A housing 1 is overlain by an exposer 200, which is shielded from other portions by a partition 224. The exposer 200 is formed with an aperture 228 on its optical axis.

To the side of the housing 1, there is removably attached a photosensitive material cartridge 14 which supports a photosensitive material roll 12 having a pressure-sensitive type thermal development color photosensitive material S (which will be shortly referred to as the "photosensitive material") wound thereon. At the exit 16 of the photosensitive material cartridge 14 for the photosensitive material S, there are arranged a pair of photosensitive material let-off rollers 22, which are accommodated in a magazine-connected camera obscura 20, to let off the photosensitive material S a constant length from the roll 12 when in a predetermined operation.

The rollers 22 are moved apart from each other, as indicated by phantom lines, to facilitate the progress of the photosensitive material S when the leading end portion of the photosensitive material S arrives. A cutter unit 23 for cutting the photosensitive material S, and a guide plate 24 are arranged in front of (i.e. downstream in the proceeding direction of the photosensitive material) the camera obscura 20.

In front of the guide plate 24, there are arranged a photosensitive material bearing roll 26 and two photosensitive nip rolls 28 and 30 which are held in pressure contact with the bearing roll 26 The photosensitive material S, guided by the guide plate 24 is forced into close contact with the bearing roll 26 by the nip rolls 28 and 30 so that it is exposed to an image at an intermediate position 32 between the nip rolls 28 and 30 by the exposer 200.

In front of the bearing roll 26, there is arranged a thermal developer 40 for heating and developing the exposed photosensitive material S. The thermal developer 40 is composed of, a developing housing 42 having a thermal insulation; a heating roll 44 arranged in the developing housing 42 and heated at about 120° C.; an endless belt 50 borne on four belt bearing rolls 46, 47, 48 and 49 and wound on the arc of about 270 degrees of the outer circumference of the heating roll 44; and a nip roll 52 held in pressure contact with the bearing roll 49.

Other components of the thermal developer 4 are, a guide 54 for guiding the photosensitive material S delivered from the bearing roll 26 over the heating roll 44 and for peeling the material S thermally developed from the heating roll 44; and a vertical guide 58 for guiding the developed photosensitive material S delivered by the bearing roll 49 and the nip roll 52 to an exit 56. This exit 56 is equipped with a leading end sensor 60 for detecting the leading end of the photosensitiVe material S.

Disposed just below the exit 56, there is arranged a superposer 70 for superposing the photosensitive material and a image receiving paper. This superposer 70 is composed of a pair of pressure rolls 62 and 64, a nip roll 66 held in pressure contact with the pressure roll 64, and a guide member 68 for guiding the image receiving paper, which is delivered by the pressure roll 64 and the nip roll 66, to the abutting portions of the pressure rolls 62 and 64.

Disposed to the side of the superposer 70, there is arranged a supply 72 for supplying the image receiving paper This image receiving paper supply 72 is composed of a supply cassette 74 which is removably attached in a position projecting from the housing 1, a paper let-off roll 76 for letting off the image receiving paper C from the cassette 74, and a guide plate 78 for guiding the image receiving paper C, which is let off from the let off roll 76, to the abutting portions between the pressure roll 64 and the nip roll 66. Here, the image receiving paper C is narrower by about 6 mm than the photosensitive material S and is superposed in the widthwise center on the photosensitive paper S by the superposer 70.

Below this superposer 70, there is disposed a transfer device 88 which is composed of a pair of pressure nip rolls 80 and 82 and backup rollers 84 and 86 for backing up the pressure nip rolls 80 and 82 to make their pressures uniform in the axial direction. The pressure nip rolls 80 and 82 are held in pressure contact with each other under a pressure of about 500 kg/cm².

Below the transfer device 88, there is disposed a peeler 90 for peeling the photosensitive material S and the image receiving paper C This peeler 90 is composed of a guide member 92, a first delivery roll 94 a second delivery roll 96, and a peeling belt 102 which is made to run on guide rolls 98 and 100 such that it is held in pressure contact with the photosensitive material S at the two outer end portions on the first roll 94.

A disposer 104 for disposing the photosensitive material S is arranged at one side of the peeler 90, and a fixer 106 is disposed at the other side The disposer 104 is composed of a guide member 108, a pair of delivery rolls 110 and 112, and a disposal box 114. Thus, the photosensitive material S is delivered from the peeler 90 and guided by the guide member 108 until it is poured into the disposal box 114 by the delivery rolls 110 and 112.

The fixer 106 is composed of a guide member 120, an ultraviolet ray irradiating lamp 124 having a reflecting member 122, and a pair of delivery rolls 126 and 128. Thus, the fixer 106 fixes the image receiving paper C by irradiating it with an ultraviolet ray for about five seconds after the paper C has been delivered from the peeler 90 and guided by the guide member 120.

To the front of the fixer 106, there is attached a take-out tray 130 which projects from the housing 1 to receive the image receiving paper C.

Figure 1:
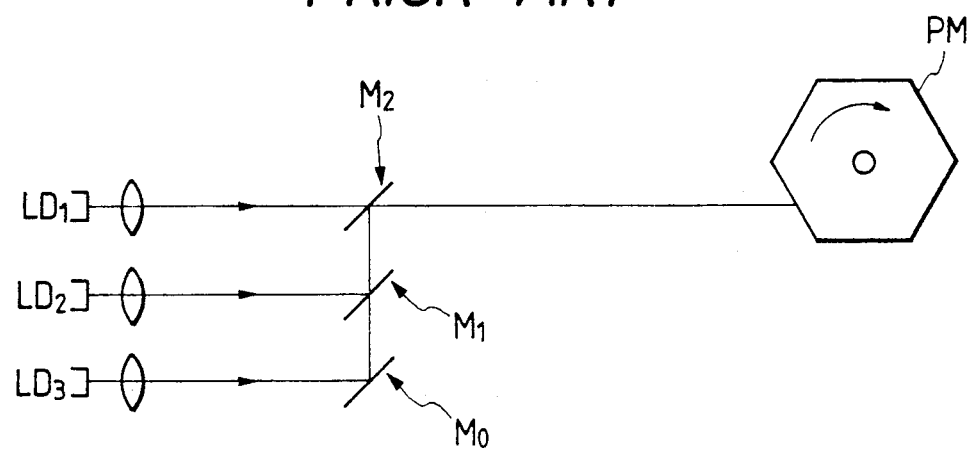
FIG. 1 is a schematic view showing the composition of optical axes according to the prior art.
Figure 3:
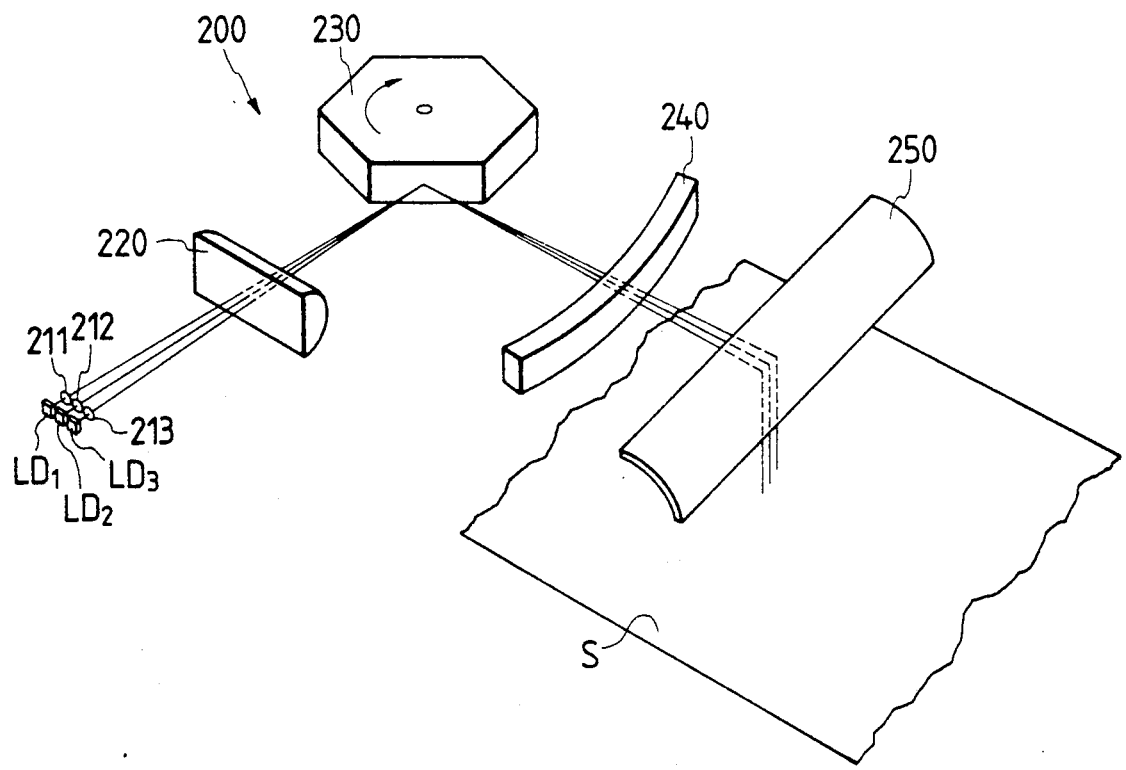
FIG. 3 is a schematic view showing an exposer used in the image recording apparatus.

FIG. 3 is a schematic view showing the exposer 200 using semiconductor lasers $LD_1$, $LD_2$ and $LD_3$ corresponding to red green and blue colors, respectively.

These semiconductor lasers $LD_1$, $LD_2$ and $LD_3$ emit red, green and blue laser beams. These laser beams pass through corresponding collimator lenses 211, 212 and 213 and are condensed by a cylindrical lens 220 into a certain point on a polygon mirror 230. These beams are then reflected at their respective angles of reflection with respect to their corresponding angles of incidence upon the reflecting faces of the polygon mirror 230. The beams thus reflected pass through an $f\theta$ lens 240 and are reflected by a cylindrical mirror 250 to expose the photosensitive material S. These semiconductor lasers $LD_1$, and $LD_2$ and $LD_3$ are so arrayed in a common plane that their three optical exposure positions on the photosensitive material S may be aligned on a scanning line. Here, the image exposure is accomplished by reducing the distance between the polygon mirror 230 and the exposed surface of the photosensitive material S and arranging the individual semiconductor lasers as close to one another as possible so that the incidence angles of the individual laser beams upon the polygon mirror may become as near as possible to each other to reduce the offset of the positions of irradiation.

Figure 4:
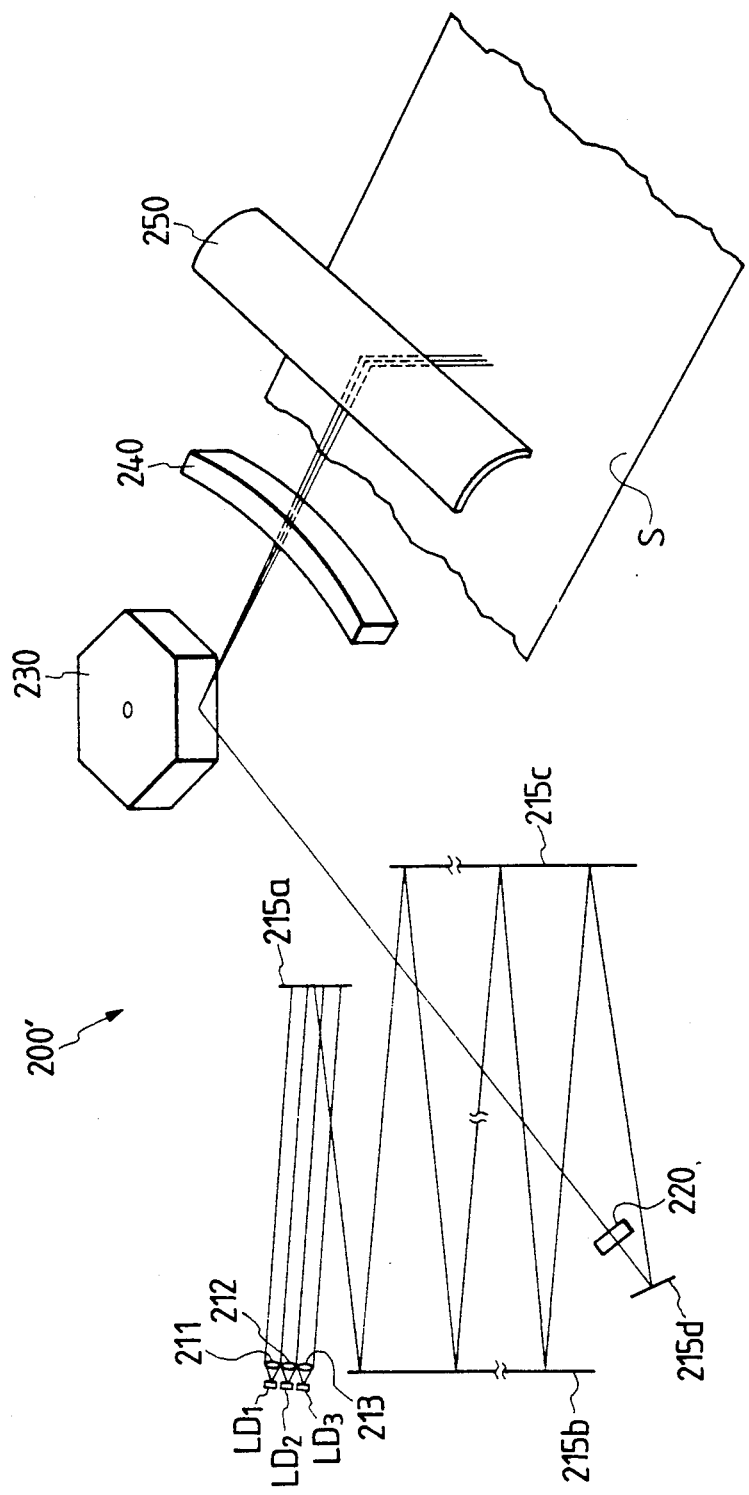
FIG. 4 is a schematic view showing another example of the exposer.

Another embodiment of an exposer 200 for reducing the difference among the incidence angles of the beams from the three semiconductor lasers upon the polygon mirror 230 is schematically shown in FIG. 4. This exposer 200 is further equipped with a series of mirrors 215a to 215d. These mirrors 215a to 215d are interposed to face one another between collimator lenses 211 to 213 and the cylindrical lens 220 of the exposer 200 shown in FIG. 3, to repeat reflections of the beams emitted from the semiconductor lasers $LD_1$, $LD_2$ and $LD_3$ to thereby irradiate a desired point of the polygon mirror 230 By repeating the reflections with mirrors 215a to 215d, it is possible to retain the distances from the semiconductor lasers $LD_1$, $LD_2$ and $LD_3$ to the polygon mirror 230 even with a limited or small space. For example the semiconductor lasers $LD_1$, $LD_2$ and $LD_3$ can be spaced by about 18 m from the polygon mirror 230 if the average distance between the mirrors is set at 50 cm and if the reflections are accomplished 36 times (i.e., $36 \times 50$ cm = 1.800 cm or 18 ml). Moreover if the semiconductor lasers $LD_1$, $LD_2$ and $LD_3$ are arranged between each other at an interval of 3 mm, and the distance from the polygon mirror 230 to the surface of the photosensitive material S is 300 mm, the offsets of the three beams on the exposure surface can be reduced to about 100 microns for $x = 0.1$ by the following equation:

$$x/300 = \tan\theta = (3 \times 2)/18000,$$

wherein x: the offset on the exposure surface; and $\theta$: the angle of incidence (or reflection).

In the image recording apparatus thus far described, a more accurate exposure can be accomplished by measuring the positions of irradiation on the photosensitive material at the stage of manufacture, by determining the perpendicular offset with respect to the scanning line on the basis of the measured irradiation positions by the adjustment of the positions of the semiconductor lasers by determining the parallel offset with respect to the scanning line by the adjustment of the individual emission timings of the semiconductor lasers, and by controlling the emissions by storing the adjustments.

In other words, an image without any color discrepancy can be obtained by the timing controls even if the lengths of the optical paths from the semiconductor lasers to the polygon mirror are so short to provide larger offset on the exposure surface. If, for example an offset of 6 mm can be corrected by the timing controls, the lengths of the optical paths between the semiconductor lasers and the polygon mirror may be 300 mm.

Incidentally, the embodiments thus far described uses the semiconductor lasers as their light emitting device, but the embodiments may use any light emitting device if it can express colors by combining light emissions from gas lasers or the like.

As has been described hereinbefore, according to the present invention the size of the polygon mirror can be reduced, as required, by irradiating the reflecting faces of the scanning polygon mirror at the substantially common point with the imaging optical beams. Thus, the image recording apparatus can be small-sized. Moreover according to the simple construction of the present invention, the alignment of the optical axes can be easily accomplished.

What is claimed is:

1. An image recording apparatus for recording an image by controlling the scanning and irradiation of a photosensitive material with a plurality of separate non-co-linear optical beams, each of the optical beams having a different wavelength, the apparatus comprising:

light emitting means disposed in a common plane, for respectively radiating the plurality of separate non-co-linear optical beams from said light emitting means to the photosensitive material, thereby scanning and exposing the photosensitive material;

wherein said light emitting means are arranged close to one another such that each of the reflecting faces of said mirror is irradiated with the optical beams at a substantially common point thereof and the optical exposure positions on said photosensitive material are aligned on the same scanning line.

2. The image recording apparatus according to claim 1, wherein said mirror is rotatable and has a polygon shape.

3. The image recording apparatus according to claim 2, further comprising:

at least two mirrors disposed between said light emitting means and said rotatable polygon mirror and arranged to face each other for reflecting the radiated optical beams from said light emitting means a plurality of times to thereby irradiate said rotatable polygon mirror with said optical beams at a substantially common point on said mirror 4. The image recording apparatus according to claim 1, further comprising, emission control means for energizing said light emitting means, respectively, at irradiation timings which are determined in accordance with the amount of offset of the irradiation positions on said photosensitive material with the optical beams reflected by said mirror.

5. The image recording apparatus according to claim 1, wherein said light emitting means comprise semiconductor lasers for emitting red green and blue colors.

6. The image recording apparatus according to claim 1, further comprising collimation means for collimating the optical beams emitted from said light emitting means.

7. The image recording apparatus according to claim 5, further comprising condensation means for condensing the collimated optical beams at one point on said mirror 8. The image recording apparatus according to claim 1, further comprising guide means for guiding the optical beams reflected by said mirror to expose the photosensitive material.

9. The image recording apparatus according to claim 8, wherein said guide means comprises an f$\theta$ lens and a cylindrical mirror.

10. The image recording apparatus according to claim 1, further comprising a cylindrical lens disposed between said light emitting means and said mirror, wherein said optical beams pass through said cylindrical lens before irradiating said reflecting faces at a substantially common point.

11. The image recording apparatus according to claim 1, wherein a distance between said light emitting means and said mirror is greater than a distance between the mirror and the photosensitive material.

* * * * *